United States Patent
Mestha et al.

(10) Patent No.: US 7,513,952 B2
(45) Date of Patent: Apr. 7, 2009

(54) MODEL BASED DETECTION AND COMPENSATION OF GLITCHES IN COLOR MEASUREMENT SYSTEMS

(75) Inventors: Lalit K. Mestha, Fairport, NY (US);
Yao Rong Wang, Webster, NY (US);
Kenneth J. Mihalyov, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1572 days.

(21) Appl. No.: 10/000,379

(22) Filed: Oct. 31, 2001

(65) Prior Publication Data

US 2003/0081214 A1    May 1, 2003

(51) Int. Cl.
*B05C 11/10* (2006.01)
(52) U.S. Cl. .................. 118/712; 118/713; 358/519; 358/520; 358/521; 358/522; 358/523; 382/167
(58) Field of Classification Search ......... 358/519–523, 358/3.24, 3.26; 382/167; 156/378, 379; 118/712, 713
See application file for complete search history.

(56) References Cited

U.S. PATENT DOCUMENTS

| | | | |
|---|---|---|---|
| 4,660,082 A | | 4/1987 | Tomohisa et al. |
| 5,471,324 A | * | 11/1995 | Rolleston .................. 358/518 |
| 5,612,902 A | * | 3/1997 | Stokes ......................... 702/85 |
| 6,021,285 A | | 2/2000 | Mestha et al. |
| 6,115,561 A | | 9/2000 | Fukushima |
| 6,178,007 B1 | | 1/2001 | Harrington |
| 6,222,648 B1 | * | 4/2001 | Wolf et al. .................. 358/504 |
| 6,801,334 B1 | * | 10/2004 | Enomoto .................. 358/1.18 |
| 6,809,837 B1 | | 10/2004 | Mestha et al. |

FOREIGN PATENT DOCUMENTS

| | | |
|---|---|---|
| JP | 10-39555 H | 2/1998 |
| JP | 2000-184198 | 6/2000 |
| JP | 2001-209788 | 8/2001 |

OTHER PUBLICATIONS

R. Balasubramanian, "Optimization of the Spectral Neugebauer Model For Printer Characterization", Journal of Electronic Imaging 8(2), 156-166 (Apr. 1999).
R. Balasubramanian, Martin S. Maltz, Refinement of Printer Transformations Using Weighted Regression:, Proc. SPIE, vol. 2658, pp. 334-340, (1996).
Machine generated translation of JP2000-184198, Jun. 30, 2000.

* cited by examiner

*Primary Examiner*—George R Koch, III
(74) *Attorney, Agent, or Firm*—Fay Sharpe LLP

(57) ABSTRACT

A color sensor monitors the output of a color producing process and produces a signal representative of a color produced by the color producing process. The signal can be used as feedback signal to control the process. Occasionally, the color sensor signal includes a component representing a transient error. A system model of the color producing process is used to predict reasonable sensor signals. A comparison of the sensor signal with the predicted sensor signals is used to determine if the sensor signal is reasonable. If the sensor signal is unreasonable, a substitute signal is used as the feedback signal to the control process. The substitute signal can be a predicted sensor signal or a signal based on historical system performance data.

5 Claims, 5 Drawing Sheets

MODEL BASED DETECTION AND COMPENSATION OF GLITCHES IN COLOR MEASUREMENT SYSTEMS

BACKGROUND OF THE INVENTION

1. Field of the Invention

The invention is related to the art of color measurement. More specifically the invention is related to a method and apparatus for the detection and filtering of transient errors from a signal produced by a color measurement device. The method includes the substitution of a reasonable signal for color measurement signals that are outside reasonable levels. A system model or historical data are used to determine a reasonable signal level for a given color. The invention will be described in reference to a color reprographic environment such as, for example a color xerographic environment. However, the invention is applicable to any environment where color is a useful measure of a process or plant. For example, the invention finds application in monitoring the dying of textiles, plant hydration, food processing and industrial control applications, such as, for example, coil coating.

2. Description of Related Art

In order to provide the best possible color reproduction, reprographic devices have been developed that include color sensors. For example, spectrophotometers have been included in reprographic environments, such as, for example color xerographic environments. The color sensors provide color feedback signals for color control systems. The color control systems use the feedback signals to selectively adjust control parameters and/or color compensation techniques to maintain optimum color reproduction performance.

For example, a color control system may use a color feedback signal to adjust the shape or values associated with a tone reproduction curve (TRC). Tone reproduction curves are known in the art of color reproduction. Tone reproduction curves relate a given color request or input, to an amount of colorant or output signal required to produce the requested color.

In order to maximize a number or percentage of high quality copies produced in a given reproduction run, the color control systems are tuned to respond quickly to system changes reported by the color sensor. As a result, noise or sensor glitches can cause significant control system disturbances. Such disturbances can affect the quality of an unacceptably large number of print job copies. Additionally, unnecessary machine shut downs and service calls are sometimes made in response to the print quality problems resulting from momentary sensor errors.

One solution to this problem is to detune the color control system. Detuning the system would slow system response, thereby reducing the significance of any short-lived color sensor transient. However, detuning the system would also slow system responses to less transient events and perhaps increase following errors in general.

Another solution to this problem might be to add one or more backup or redundant color sensors to the system. For example, a plurality of color sensors, sensing the same color or image portion could be polled. The most reasonable measured color sensor signal could then be treated as the correct or preferred sensor signal. However, this approach has several drawbacks. For example, color sensors are expensive. Additionally, multiple sensors may not fit in a particular system.

Instead of detuning the color control system or installing backup sensors, it is preferable to simply log or count transient errors and to continue printing based on best available information. For example, a system model can be used to temporarily replace the sensor signal. A system shut down and/or service call need only occur if, for example, the transient errors occur at an unacceptably high rate.

BRIEF SUMMARY OF THE INVENTION

To those ends, a method operative to process transient errors produced in a color measurement system monitoring a color producing process has been developed. The method comprises implementing a model of the color production process, monitoring an input to the color production process, predicting an expected color signal based on the model and the monitored input, measuring an output color produced by the color producing process to produce a measured color signal, comparing the measured color signal to the expected color signal to produce a color error value, and, selectively replacing the measured color value based on the color error value.

For example, selectively replacing the measured color value includes replacing the measured color value with a predicted color signal based on the expected color signal. For instance, if the color error value is large, because the measured color value is unreasonable or very different than the predicted color value, then the measured color value may be replaced with the predicted color value.

One embodiment of the invention is a method for calibrating a color reproduction device. The method includes producing an image with the reproduction device in response to an input signal requesting the production of a target color, measuring with a sensor, a color of the produced image, to generate a measured color signal value, calculating an estimated color signal value based on the input signal, validating the measured color signal value by comparing it to the estimated color signal value, selecting a preferred color signal value from among at least the measured color signal value, and the estimated color signal value, based on the validity of the measured color signal value, determining an error between the preferred color signal value and the target color, and, selectively adjusting parameters of a control system of the color reproduction device to minimize the determined error for subsequently produced images.

An exemplary system operative to filter transient errors from a color measurement signal includes a color producing process, a model of the color producing process, the model and the process operative to receive an input and, based on the input, produce a model color signal and a process output, respectively. The system also includes a color sensor operative to produce a measured color signal representative of the process output color, a preferred signal selector operative to select a preferred signal from among at least the model color signal, and the measured color signal, and, a signal consumer, operative to receive the preferred signal from the preferred signal selector. For example, the signal consumer is a system controller, wherein the preferred signal is operative as a feedback signal.

One advantage of the present invention relates to providing a filtered color measurement signal.

Another advantage of the present invention resides in a reduction or elimination of undesirable control system perturbations. The reduction in control system perturbations results in an increased system output quality and an increase in print job yield.

Yet another advantage of the present invention is found in an ability to maintain a high frequency response with regard to non-transient system changes.

Still other advantages of the present invention will become apparent to those skilled in the art upon a reading and understanding of the detail description below.

BRIEF DESCRIPTION OF THE SEVERAL VIEWS OF THE DRAWINGS

The invention may take form in various components and arrangements of components, and in various procedures and arrangements of procedures. The drawings are only for purposes of illustrating preferred embodiments, they are not to scale, and are not to be construed as limiting the invention.

DETAILED DESCRIPTION OF THE INVENTION

Figure 1:
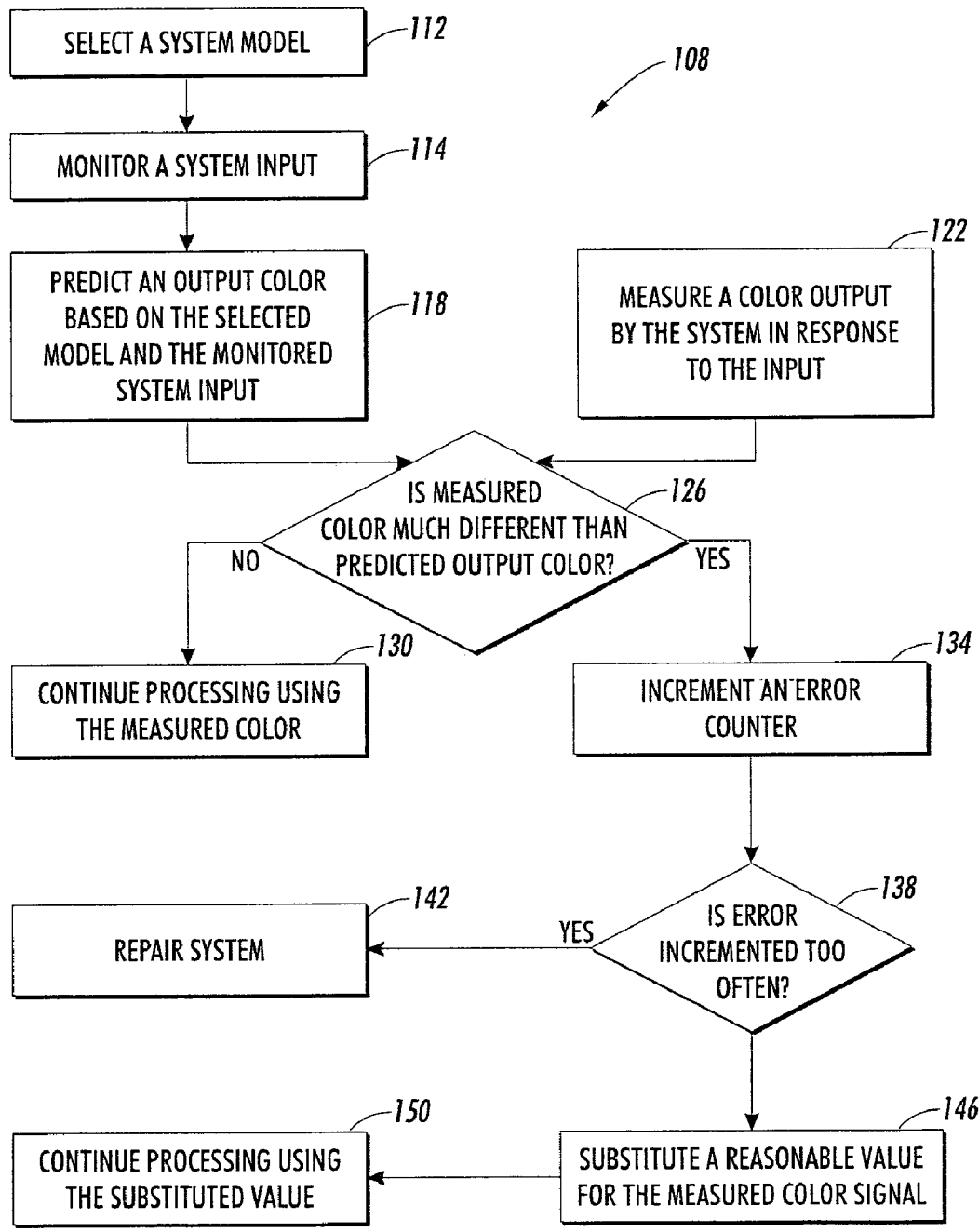
FIG. 1 is a flow chart outlining a method of filtering a color sensor signal.

Referring to FIG. 1, a method 108 for filtering transient errors from a color measurement signal includes using a model to determine when a color signal contains noise or a glitch. For instance, a color sensor is used to monitor the output of a system that produces, or effects, a color. The color sensor generates a color measurement signal. Preferably, the measurement signal is representative of the system output. However, the color measurement signal occasionally includes noise or measurement glitches. The noise or measurement glitches are to be filtered out. The filtering method 108 includes the selection and/or implementation 112 of a model that describes the color producing or effecting system. The system has an input, such as, for example, a signal representing a requested color. The system input is monitored 114 or recorded. A copy of the input is entered into the system model. The system model generates 118 a predicted output color or predicted color signal. Optionally, and/or selectively, the color measurement signal, generated by the color sensor, and/or other feedback signals, is used to continuously modify or update system model parameters. Of course, the color sensor measures 122 the actual color output of the system and, as mentioned above, produces the color measurement signal. The color measurement signal and the predicted color signal are compared 126 to determine if the color measurement signal is reasonable or within a reasonable range of the predicted color signal.

If 126 the measured color signal is within a reasonable range of the predicted color signal then the measured color signal is deemed to be correct and the measured color signal is used in further processing 130. For example, the measured color signal is used as a feedback signal. The feedback signal is used to close a control loop and/or to update system model parameters. The measured color signal may also be logged or entered into a database to contribute to an historical performance database. The historical performance database may be used as an alternate predictor of system output.

For example, the measured color signal is stored in the database in relation to the monitored system input signal. Regression techniques are used on a plurality of such entries to determine parameters or coefficients of a system descriptive polynomial. The polynomial can be used to generate or predict system outputs based on system input signals.

If 126 the measured color signal is outside a reasonable range from the predicted color signal, an error counter is incremented 134. The error counter is incremented 134 in order to keep track of a number of, or a rate at which, transient errors or glitches occur. While an occasional transient error can and should be ignored for feedback or historical performance database purposes, frequent or persistent transient error events may indicate the presence of a significant problem in the system. Therefore, in an error counter evaluation 138 a determination is made as to whether transient errors have been occurring too frequently or if a total number of the transient errors is too high. If 138 the results of the evaluation warrant it, provisions are made to repair the system 142. For example, an alarm message in displayed requesting that a service call be made. Alternatively the system itself may send an electronic message, such as an email or a phone call, requesting diagnostic and repair services. Even if repair services are requested, system operation may continue. Certainly, if transient errors have been occurring at a tolerable rate, processing continues. A signal substitution 146 temporarily replaces the color measurement signal with a preferred reasonable value. For example, the predicted color signal is temporarily used for the purposes of further processing. Alternatively, a value derived from the historical database is used. Whatever value is selected to be the preferred color signal, that value is used in further system processing 150. For example, the preferred 146 color signal may be used in place of the color measurement signal for the purpose of closing a control loop. Of course, the phrase—closing a control loop—is used loosely here. The preferred 146 color signal is delivered to a control system that expects and requires a feedback signal. However, since the preferred 146 color signal is mathematically or statistically determined, and not a real measurement, the preferred 146 color signal is not a closed loop feedback signal in the strictest sense. Nevertheless, the preferred 146 color signal is expected to be a closer representation of current system performance that is the glitch or transient containing, measured color signal. In this respect, the temporary substitution of the preferred color signal for the measured color signal filters the glitch or transient error from the measured color signal.

The method 108 for filtering transient errors from a color measurement signal can be used in many industries and devices. For example, the method 108 for filtering transient errors can be used in conjunction with a textile manufacturing plant. The color resulting from the application of dyes or combinations of dyes can be monitored and controlled through the use of one or more color sensors that produce color measurement signals. The color measurement signals can be beneficially filtered using the method 108 for filtering transient errors. Similarly, the processes of a green house can benefit from the method for filtering transient errors from a color signal. The amount of water, a plant receives can affect, for example, the color of the plants leaves and/or flowers or fruits. Plant hydration can be controlled through the use of a feed back signal from a color sensor. Such a system may benefit from the use of the method 108 for filtering transient errors from a color measurement signal. The method 108 for filtering transient errors from a color measurement signal is also beneficially applied to reprographic environments, such as, for example, color xerographic, ionographic, ink jet, and other reprographic environments.

Figure 2:
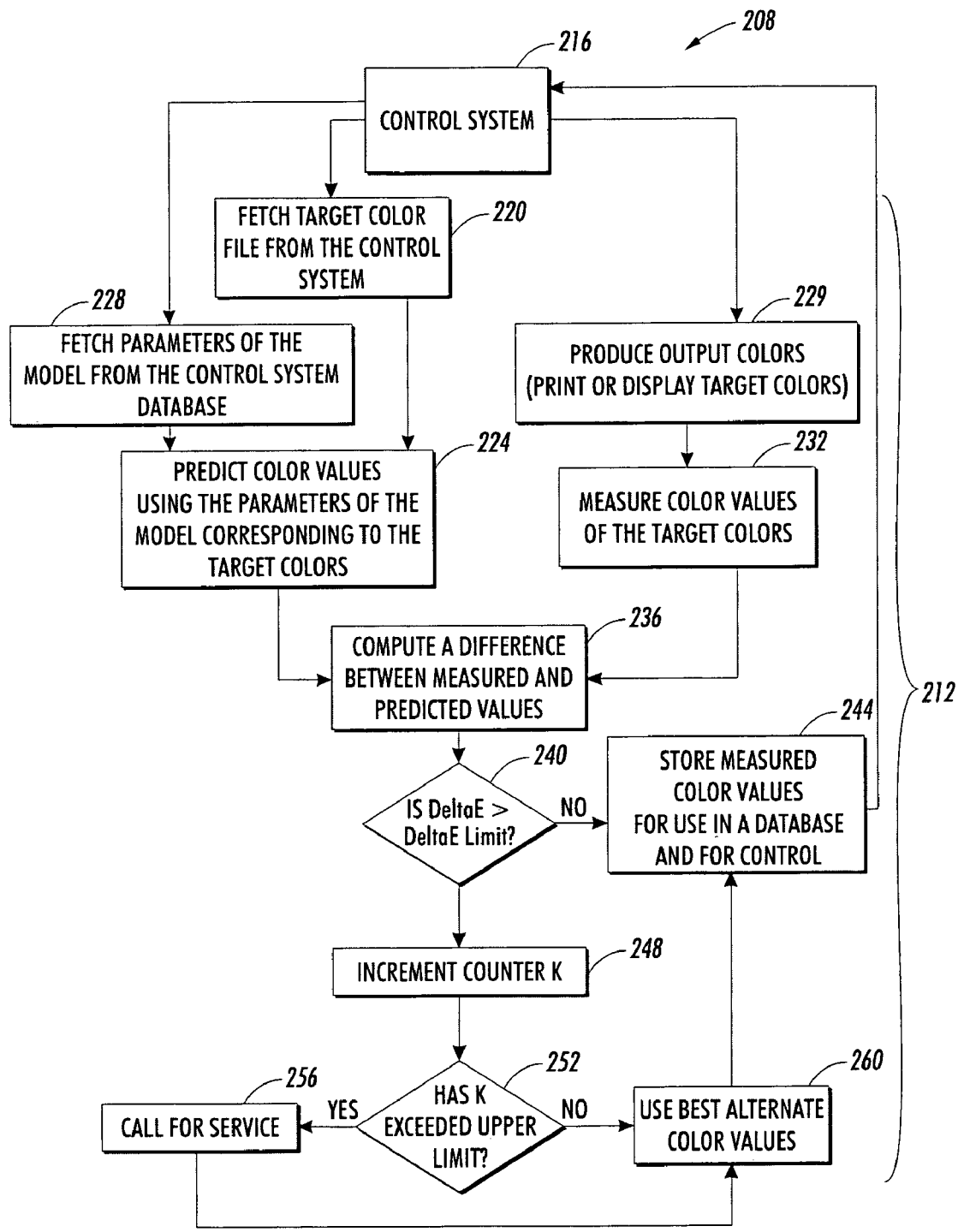
FIG. 2 is a flow chart of a system including an embodiment of the method of FIG. 1.

For example, referring to FIG. 2, a reprographic process 208, such as a color xerographic reprographic process, includes an embodiment 212 of the method 108 for filtering transient errors from a color measurement signal. A system control process 216 communicates with sub-processes of the embodiment 212. The control process receives or generates (not shown) an input signal representing a target color to be printed. For example, the control process receives a target color from an image source such as a scanner or a computer network. Alternatively, the control process 216 generates a target color input signal of its own. For example, the control process generates an input signal representative of a calibration color patch. For instance the color patch is a gray color patch composed of a mixture of several colorants (e.g. cyan, magenta, and yellow). The system input is monitored 220. The monitoring process 220 fetches a copy of the input signal and passes it to a modeling process 224. Optionally, or selectively, model parameters are updated 228. For example, the control system database may be updated as a result of measured color signals previously received from a color sensor. Preferably, the modeling process 224 generates a predicted or expected color signal in the same units or color space as the color sensor operates in. For example, where the color sensor generates a measured color signal in units of L*a*b* of the CIELAB (Commission Internationale de l'Eclairage) color space, the modeling process preferably generates a predicted color signal in the same L*a*b* units. The modeling process can take advantage of any applicable model. For example, the modeling process 224 can use a Neugebauer model, such as, for example a refined parameterized Neugebauer model. Alternatively, the model used by the molding process can be a multidimensional numerical model. For example, the model can be a multidimensional numerical model built using interpolation on data obtained through input-output experiments. In a further alternative the model is an on-line statistical parameterized model estimated using real-time system identification techniques.

In any event, preferably contemporaneous with the modeling process 224, the control system sends commands to a rendering device, such as, a xerographic, ionographic, or ink jet print engine, to render or produce 229 a color in response to the input signal. As mentioned above the color can be part of a source image provided by or indicated by a system user, or the color can be part of an internally generated or retrieved calibration image.

The rendered color is measured 232 by a color sensor. For example, the rendered color is measured by spectrophotometer. The color sensor generates a measured color signal in response to the rendered color. As mentioned above, preferably the measured color signal is calibrated in the same units as the predicted color signal.

The measured color signal and the predicted color signal are compared 236 to determine if the color measurement signal is reasonable or within a reasonable range of the predicted color signal. For example, when operating in the CIELAB color space, a deltaE value is computed. The deltaE value is a measure of a distance between the two points (the measured and predicted color signals) in L*a*b* space.

The magnitude of the deltaE value is compared 240 to a deltaE threshold value. If the measured color signal is within a reasonable range of the predicted color signal (i.e. less than the deltaE threshold), then the measured color signal is deemed to be correct and the measured color signal is used in further processing 244.

For example, in one xerographic environment, a threshold value of 20 deltaE appears to be satisfactory. A useful method for selecting at least an initial threshold value for a particular reprographic system is to compute the centroid of a color gamut of the associated rendering device. For example, input-output experiments are run to determine the range of colors the rendering device can produce. Once the color gamut of the rendering device is established, the deltaE of the boundary point furthest from the centroid can be determined. This boundary point deltaE value is suitable as a first threshold value. Of course, actual filter performance may warrant adjustments to this first threshold value. Furthermore, it may be useful to vary the threshold value as a function of, for example color space location. For instance, one threshold value may be appropriate for boundary colors, while another threshold value may be appropriate for colors near the centroid.

As mentioned, if the measured color signal is within a reasonable range of the predicted color signal then the measured color signal is deemed to be correct and the measured color signal is used in further processing 244. For example, the measured color signal is used as a feedback signal to the system control process 216. The feedback signal is used to close a control loop and/or to update system model parameters. The measured color signal may also be logged 244 or entered into a database to contribute to an historical performance database. As mentioned above, the historical performance database may be used as an alternate predictor of system output or as a source of a preferred color signal.

If the measured color signal is outside a reasonable range from the predicted color signal an error counter is incremented 248. The error counter is incremented 248 in order to keep track of a number of, or a rate at which, transient errors occur. While an occasional transient error can and should be ignored for feedback or historical performance database purposes. Frequent or persistent transient error events may indicate the presence of a significant problem in the color sensor. Therefore, in an error counter evaluation 252 a determination is made as to whether transient errors have been occurring too frequently or if a total number of transient errors is too high. If the results of the evaluation warrant it, provisions are made to repair the color sensor 256. For example, an alarm message in displayed requesting that a service call be made. Alternatively the system itself may send an electronic message, such as an email or a phone call, requesting diagnostic and repair services. Even if repair services are requested, system operation may continue. Certainly, if transient errors have been occurring at a tolerable rate, processing continues. A signal substitution 260 temporarily replaces the color measurement signal with a preferred reasonable value or color signal. For example, the predicted color signal is temporarily used for the purposes of further processing. Alternatively, a value derived from the historical database is used. Optionally, the preferred signal is logged 244 along with an indication of the source of the preferred signal (model, historical data, etc). Whatever value is selected to be the preferred color signal, that value is passed to the system control process 216 and used in further system processing. For example, the preferred color signal may be used in place of the color measurement signal for the purpose of closing a control loop. As mentioned above, the phrase—closing a control loop—is used loosely here.

Figure 3:
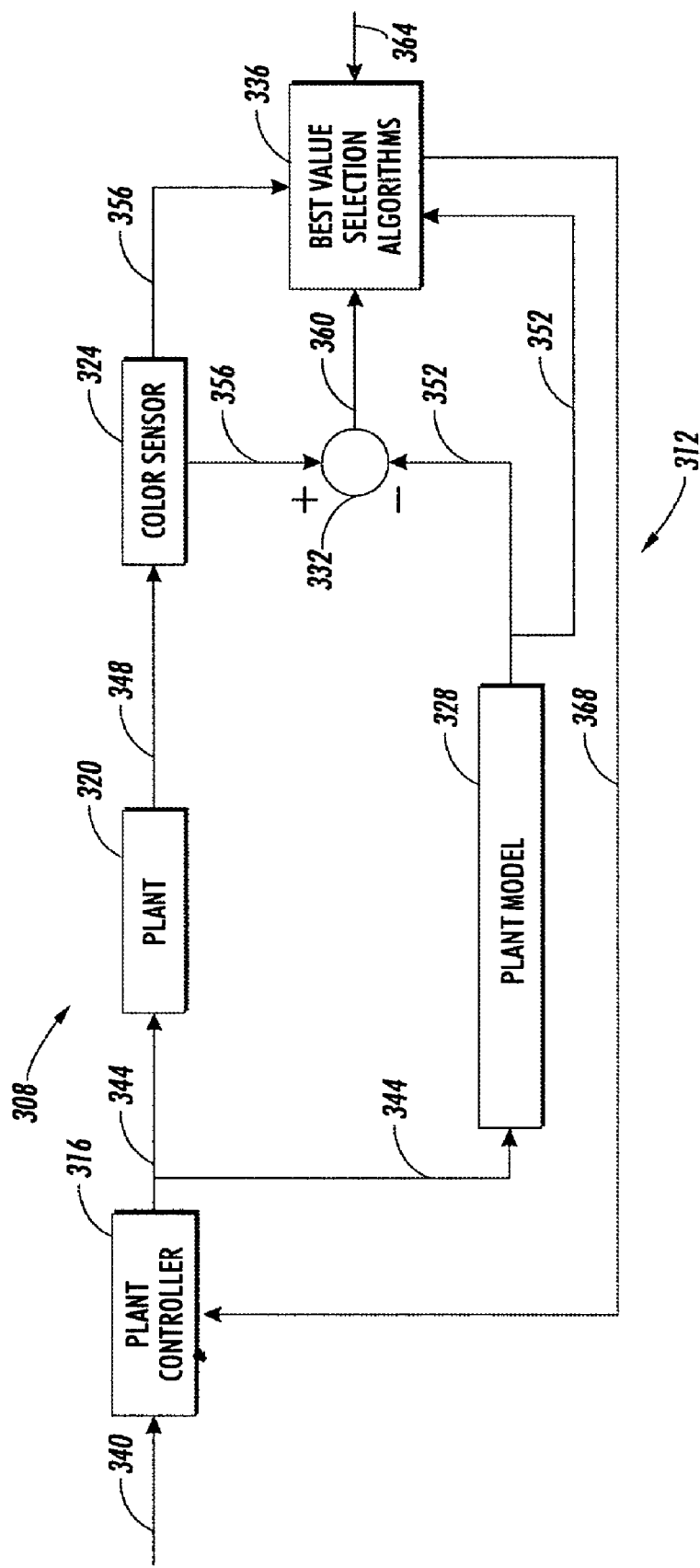
FIG. 3 is a block diagram of a system operative to perform the method of FIG. 1.

Referring to FIG. 3, a system 308 including a filtered color sensor 312 is operative to produce a color. The filtered color sensor 312 is operative to monitor the produced color. The system 308 includes a plant or system controller 316 and a plant or process 320. The plant or system 316 can be any machine, factory, process, system or device that produces a color as a part of its output or as its output as a whole. For example, the plant can be a pigment manufacturing machine, a green house, a textile mill, a food processing plant, or any other system that produces a color or a colored product or output. The filtered color sensor 312 portion of the system 308 includes a color sensor 324, a plant model 328, a signal comparer 332, and a preferred signal selector 336.

The plant controller 316 receives a set point or target 340 related to a desired output color. The controller 316 translates that set point or target 340 into a plant input 344 or series of plant inputs or commands that are delivered to both the plant 320 and the plant model 328. The plant 320 responds to the input 344 by producing output 348. Ideally, the output includes a color that exactly matches a color indicated by the set point or target 340. However, due to imperfections in material, machinery wear, and drifts in process parameters or parameters affected by environmental factors such as, for example, temperature and humidity, the output may not have a color that is an exact match to the color indicated by the set point or target 340.

The model 328 includes mathematical equations or functions that represent the processes of the plant 320. The model is any system model that can be adapted to accurately represent the plant. Exemplary models include a refined parameterized Neugebauer model, a multidimensional numerical model built using interpolation on data obtained through input 344-output 348 experiments, and an online parameterized statistical model estimated using real-time system identification techniques.

The model responds to the input 344 by calculating or predicting the color of the output, thereby generating a predicted or expected color signal output 352. The prediction is based on the selected form or type of the model, and on parameters or coefficients related to the model. Preferably, the parameters and coefficients of the model are updated on a regular basis, based on monitored inputs 344 and outputs 348 as measured by the color sensor 324.

The color sensor 324 is, for example, a spectrophotometer. The color sensor monitors the color of the plant output 348 and produces a measured color signal 356 in response to it. The measured color signal 356 and a reference signal, such as, for example, the predicted color signal 352 are delivered to both the signal comparer 332, and the preferred signal selector 336. The comparer 332 compares the signals and produces a comparison signal 360 that represents a measure of the difference between the measured color and the predicted color. The comparison signal 360 is delivered to the preferred signal selector 336.

The preferred signal selector 336 evaluates the comparison signal in light of a comparison signal threshold 364. The comparison signal threshold 364 is a limit on a magnitude of the comparison signal 360. For example, where the comparison signal 360 represents a difference between the measured color signal 356 and the predicted color signal 352, the comparison signal threshold 364 is a limit on the magnitude of that difference. If the comparison signal 360 is below the comparison signal threshold 364, then the preferred signal selector 336 selects the measured color signal 356 to be the preferred color signal 368. If the comparison signal 360 is above the comparison signal threshold 364, then the preferred signal selector 336 selects the predicted color signal 356 to be the preferred color signal 368. Alternatively, the preferred signal selector may select a signal from another source (not shown), such as, for example, a regression curve derived from historical plant performance data stored in a historical performance database (not shown).

In any event, the preferred color signal 368 is delivered to the plant controller 316 for further processing. For example, the plant controller uses the preferred color signal as a feedback signal. Such a feedback signal is used to close a control loop and/or to modify the way the system or plant controller 316 translates set points or targets 340 into plant input signals 344.

Figure 4:
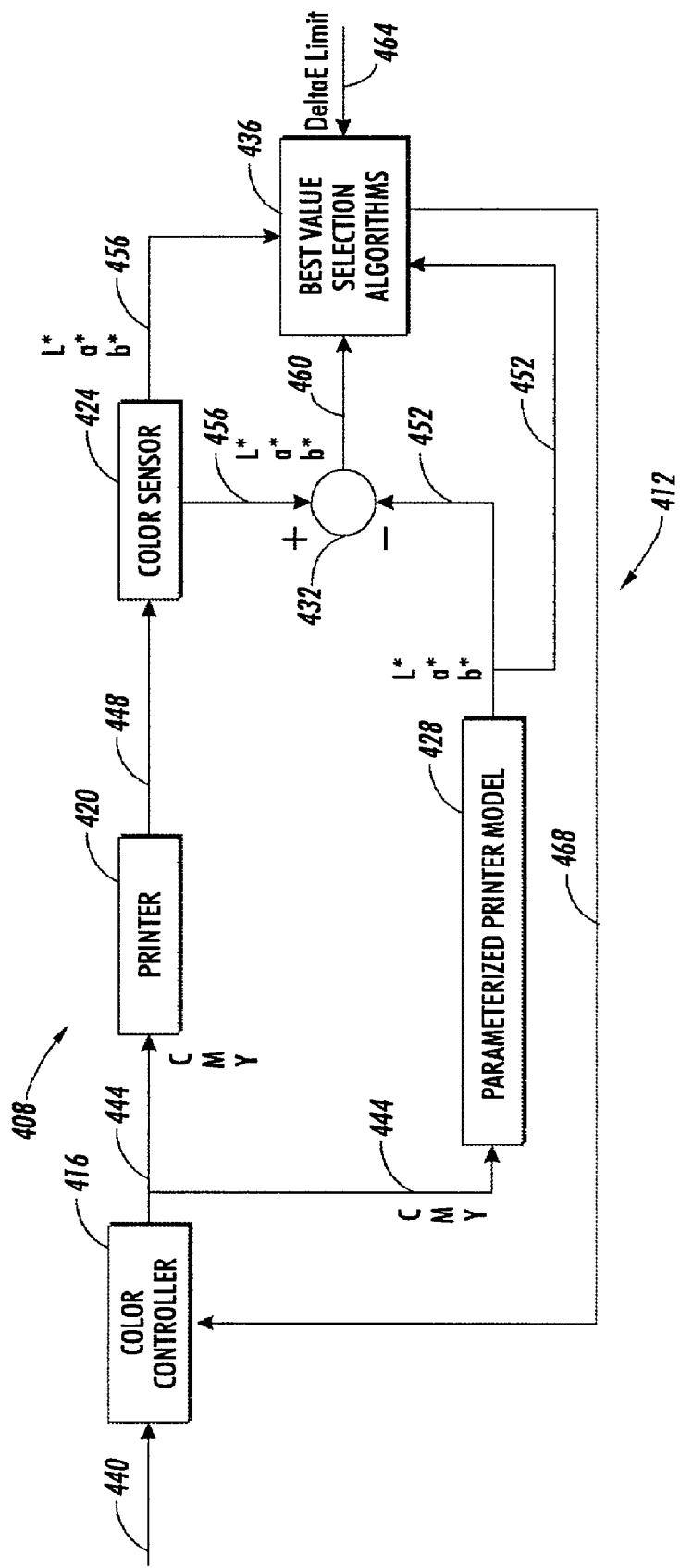
FIG. 4 is a block diagram of a reprographic system operative to perform the method of FIG. 1.

Referring to FIG. 4, in reprographic environment, such as, for example, a color xerographic environment the system 308 is a color reprographic system 408. The color reprographic system includes a filtered color sensor 412. The filtered color sensor 412 is operative to monitor a produced color. The system 408 includes a printer or color controller 416 and a rendering device 420 such as, for example, a xerographic, ionographic or ink jet printer. Xerographic printers are known in the art to include a fuser, a developer, and an imaging member. The filtered color sensor 412 portion of the reprographic system 408 includes a color sensor 424, a model of the rendering device 428, a signal comparer 432, and a preferred signal selector 436.

The color controller 416 receives a set point or target color 440 related to a desired output color. The target color may be part of a system user specified image or a system calibration target generated by, for example, a system calibrator (not shown). The controller 416 translates that set point or target 440 into a printer input 444 that is delivered to the printer 420 and the printer model 428.

Preferably the printer and printer model 428 accept input in the same units of measure. For example, typically a printer accepts input in machine dependent form. For example, a printer may accept input in the form of request for specific amounts of colorants. Cyan, Magenta, Yellow and Black (CMYK) are the names of common colorants. Therefore, printers accept inputs in the form of CMY or CMYK values. In such systems it is preferable that the printer model 428 also accept input in the form of CMY or CMYK values. The printer or rendering device 420 responds to the input 444 by producing an output image 448. Ideally, the output image 448 is of a color that exactly matches a color indicated by the set point or target 440. However, due to imperfections in material, machinery wear, and drifts in process parameters or parameters affected by environmental factors such as, for example, temperature and humidity, the output image may not exactly match to the color indicated by the set point or target 440.

The printer model 428 includes mathematical equations or functions that represent the processes of the printer 420. The model is any system model that can be adapted to accurately represent the printer. Exemplary models useful in modeling printers include a refined parameterized Neugebauer model, a multidimensional numerical model built using interpolation of data obtained through input 444-output 448 experiments, and an online parameterized statistical model estimated using realtime system identification techniques.

The model responds to the input 444 by calculating or predicting the color of the output, thereby generating a predicted color output 452. The prediction is based on the selected form or type of the model, and on parameters or coefficients related to the model. Preferably, the parameters and coefficients of the model are updated on a regular basis based on monitored inputs 444 and outputs 448 as measured by the color sensor 424.

The color sensor 424 is, for example, a spectrophotometer. The color sensor monitors the color of the output image 448 and produces a measured color signal 456 in response to it. The measured color signal 456 and the predicted color signal 452 are delivered to both the signal comparer 432, and the preferred signal selector 436.

Preferably, the measured color signal 456 and the measured color signal 456 are in the same units. For example, preferably, the color sensor 424 produces a measured color signal in a machine independent form such as, for example, L*a*b*, XYZ or Luv. In order to avoid expensive (in processing time) and error prone conversions, it is preferable that the printer model 428 generate a predicted color signal in the same L*a*b*, XYZ or Luv units as the color sensor 424.

The comparer 432 compares the measured 456 and predicted 452 color signals and produces a comparison signal 460 that represents a measure of the difference between the measured color and the predicted color. The comparison signal 460 is delivered to the preferred signal selector 436.

The preferred signal selector 436 evaluates the comparison signal in light of a comparison signal threshold 464. The comparison signal threshold 464 is a limit on a magnitude of the comparison signal 460. When, the measured and predicted color signals are in units of L*a*b* space, the comparison signal threshold 464 can be in units of deltaE. Where the comparison signal 460 represents a difference between the measured color signal 456 and the predicted color signal 452, the comparison signal threshold 464 is a limit on the magnitude of that difference. If the comparison signal 460 is below the comparison signal threshold 464, then the preferred signal selector 436 selects the measured color signal 456 to be the preferred color signal 468. If the comparison signal 460 is above the comparison signal threshold 464, then the preferred signal selector 436 selects the predicted color signal 456 to be the preferred color signal 468. Alternatively, the preferred signal selector may select a signal from another source (not shown), such as, for example, a regression curve derived from historical plant performance data stored in a historical performance database (not shown).

In any event, the preferred color signal 468 is delivered to the color controller 416 for further processing. For example, the plant controller uses the preferred color signal as a feedback signal. Such a feedback signal is used to close a control loop and/or to modify the way the system or plant controller 416 translates set points or targets 440 into printer input signals 444.

Figure 5:
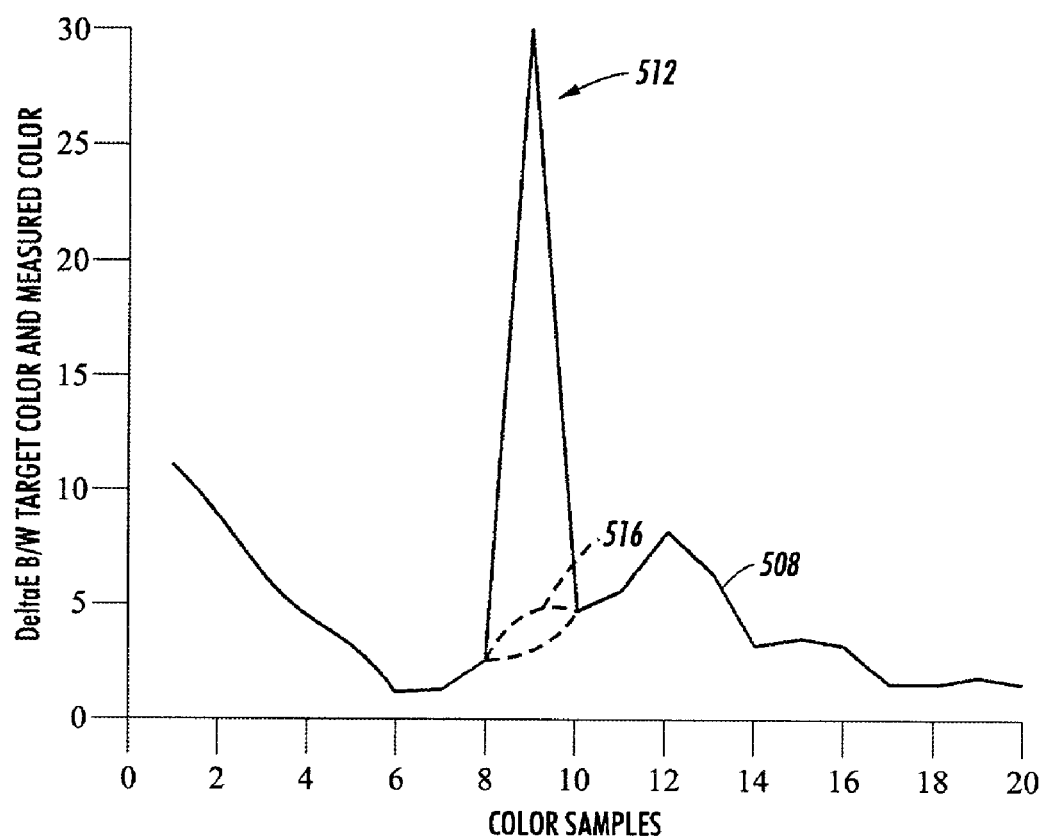
FIG. 5 is a graph illustrating the color signal glitch and the result of using the method of FIG. 1 to filter out the glitch.

In summary, referring to FIG. 5, in operation the method 108 for filtering a color signal 508, performs a filtering operation by detecting a glitch 512 or transient error in the signal and replacing it with a more likely or more reasonable value 516. The more reasonable value may come from a system model or from historical performance data about the system. The glitch is detected, by comparing the color signal to the output of a system model or to recent historical data reflective of previous system outputs related to similar system inputs or set points. Filtering or removing glitches from the color signal provides improved system stability, while allowing for critically damped or under damped system tuning.

The invention has been described with reference to particular embodiments. Modifications and alterations will occur to others upon reading and understanding this specification. While the invention has, for the most part, been described in terms of monitoring rendered colors generated by a printing device, the invention can be used to monitor any process that produces a color. For example the invention can be applied to agricultural applications to monitor a color of plants to control the amount of water, light or fertilizer they receive. The invention can be used to monitor the mixing of pigments. For example, the invention finds application in the control of the mixing of dyes or the mixing of paints. Those skilled in the art will understand how to modify exemplary embodiments to apply them these and other applications. It is intended that all such modifications and alterations are included insofar as they come within the scope of the appended claims or equivalents thereof

What is claimed is:

1. A method of processing transient errors produced in a color measurement system monitoring a color producing process, the method comprising:
    implementing a model of the color producing process;
    monitoring an input to the color producing process;
    predicting an expected color signal based on the model and the monitored input;
    measuring an output color produced by the color producing process to produce a measured color signal;
    comparing the measured color signal to the expected color signal to produce a color error value, and;
    selectively replacing the measured color signal based on the color error value.

2. The method of processing transient errors of claim 1 wherein selectively replacing the measured color signal comprises:
    replacing the measured color signal with a predicted color signal based on the expected color signal.

3. The method of processing transient errors of claim 1 further comprising:
    storing a measured color value representative of the measured color signal in association with the monitored input.

4. The method of processing transient errors of claim 1 wherein selectively replacing the measured color signal comprises:
    replacing the measured color signal with an historical color signal based on an historical value related to the monitored input.

5. The method of processing transient errors of claim 1 wherein implementing a model of the color production process comprises:
    selecting at least one of a refined parameterized Neugebauer model, a multidimensional numerical model and an on-line statistical parameterized model representative of the color producing process.

* * * * *